United States Patent
Nernberger et al.

(10) Patent No.: US 12,520,969 B2
(45) Date of Patent: Jan. 13, 2026

(54) ANTI-CAVITATION BLENDER WITH VERTICAL JAR ACTUATION

(71) Applicant: Spectrum Brands, Inc., Middleton, WI (US)

(72) Inventors: Kroy Everett Nernberger, Madison, WI (US); Steven James Buth, Deforest, WI (US); Matthew Joseph Quock, Middleton, WI (US); Matthew James Hamilton, McFarland, WI (US); David William Everett, Jr., Verona, WI (US); Daniel Richard Strong, Madison, WI (US)

(73) Assignee: Spectrum Brands Inc., Middleton, WI (US)

( * ) Notice: Subject to any disclaimer, the term of this patent is extended or adjusted under 35 U.S.C. 154(b) by 713 days.

(21) Appl. No.: 17/921,919

(22) PCT Filed: Apr. 30, 2021

(86) PCT No.: PCT/US2021/030151
§ 371 (c)(1),
(2) Date: Oct. 27, 2022

(87) PCT Pub. No.: WO2021/222737
PCT Pub. Date: Nov. 4, 2021

(65) Prior Publication Data
US 2023/0165408 A1    Jun. 1, 2023

Related U.S. Application Data

(60) Provisional application No. 63/018,000, filed on Apr. 30, 2020.

(51) Int. Cl.
*A47J 43/07* (2006.01)
*A47J 43/046* (2006.01)

(52) U.S. Cl.
CPC ......... *A47J 43/0722* (2013.01); *A47J 43/046* (2013.01); *A47J 43/0761* (2013.01)

(58) Field of Classification Search
CPC .................... A47J 2043/04472; A47J 43/0722
See application file for complete search history.

(56) References Cited

U.S. PATENT DOCUMENTS

| | | | |
|---|---|---|---|
| 1,490,617 | A | 4/1924 | McKillican |
| 3,315,946 | A | 4/1967 | Nissman |

(Continued)

FOREIGN PATENT DOCUMENTS

| | | |
|---|---|---|
| CN | 203122185 U | 8/2013 |
| CN | 203828771 U | 9/2014 |

(Continued)

OTHER PUBLICATIONS

International Search Report/Written Opinion for co-pending PCT/US2021/030151, 6 pages, Jul. 28, 2021.

(Continued)

*Primary Examiner* — Elizabeth Insler
(74) *Attorney, Agent, or Firm* — Kagan Binder, PLLC

(57) ABSTRACT

A food preparation appliance, such as a blending, mixing, or food processing appliance, allows for rotatable blade movement by a drive and/or driven shaft relative to a jar holding contents along with movement of the jar relative to the blade in the axial direction of the drive and/or driven shaft. For example, a vertical or axial movement of the blade relative to the jar, or vice-versa can be guided within defined limits. Aspects provide the consumer with an intuitive and proactive way of preventing cavitation and improving the blending performance by allowing the user to manually and indirectly physically agitate the mixture with an up and down motion of the jar during a blending operation. This option for manual operation is part of the disclosed blender (Continued)

design, so is always and conveniently available to the consumer as an anti-cavitation method.

20 Claims, 14 Drawing Sheets

(56) References Cited

U.S. PATENT DOCUMENTS

| | | | |
|---|---|---|---|
| 3,514,080 A | 5/1970 | Price et al. | |
| 3,572,621 A | 3/1971 | Whitten et al. | |
| 3,744,767 A | 7/1973 | Blasnik | |
| 4,173,925 A | 11/1979 | Leon | |
| 5,302,021 A | 4/1994 | Jennett et al. | |
| 5,639,161 A | 6/1997 | Sirianni | |
| 5,645,346 A | 7/1997 | Thuna | |
| 5,711,601 A | 1/1998 | Thomas et al. | |
| 6,254,019 B1 | 7/2001 | Galbreath | |
| 6,595,680 B2 | 7/2003 | Sanpei et al. | |
| 6,811,303 B2 | 11/2004 | Dickson, Jr. | |
| 6,862,954 B2 | 3/2005 | Dubois et al. | |
| 7,040,799 B2 | 5/2006 | Pryor, Jr. | |
| 7,217,028 B2 | 5/2007 | Beesley | |
| 7,217,029 B2 | 5/2007 | Grandjean | |
| 7,318,666 B1 | 1/2008 | Lin | |
| 7,591,438 B2 | 9/2009 | Bohannon, Jr. et al. | |
| 7,717,613 B1 | 5/2010 | Epps | |
| 7,918,601 B2 | 4/2011 | Branson, III et al. | |
| 8,491,179 B2 | 7/2013 | Kozlowski et al. | |
| 8,905,624 B1 | 12/2014 | Howe et al. | |
| 9,010,990 B2 | 4/2015 | Branson, III et al. | |
| 9,049,967 B1 | 6/2015 | Golino et al. | |
| 9,789,453 B2 | 10/2017 | Rigas | |
| 10,112,157 B1 | 10/2018 | Rigas | |
| 10,299,628 B2* | 5/2019 | Gardner | A47J 43/044 |
| 10,493,412 B2 | 12/2019 | Dickson, Jr. et al. | |
| 10,524,618 B1 | 1/2020 | Clemence et al. | |
| 2002/0098268 A1 | 7/2002 | Cohen et al. | |
| 2003/0079567 A1 | 5/2003 | Dubois et al. | |
| 2003/0214875 A1 | 11/2003 | Dickson, Jr. | |
| 2005/0036401 A1 | 2/2005 | Dickson, Jr. | |
| 2006/0171249 A1 | 8/2006 | Dickson, Jr. | |
| 2007/0253283 A1 | 11/2007 | Dickson, Jr. | |
| 2009/0114616 A1 | 5/2009 | White et al. | |
| 2010/0020633 A1 | 1/2010 | Dickson, Jr. | |
| 2012/0181362 A1 | 7/2012 | Torigai | |
| 2015/0117139 A1 | 4/2015 | Conti et al. | |
| 2015/0250360 A1 | 9/2015 | Hyp | |
| 2017/0215647 A1 | 8/2017 | Zakowski et al. | |
| 2017/0224170 A1* | 8/2017 | Nernberger | A47J 43/046 |
| 2018/0255974 A1 | 9/2018 | Ahn et al. | |
| 2019/0142221 A1 | 5/2019 | Miller et al. | |
| 2020/0085240 A1* | 3/2020 | Lee | A47J 43/0722 |

FOREIGN PATENT DOCUMENTS

| | | |
|---|---|---|
| CN | 105381737 A | 3/2016 |
| CN | 104334065 B | 8/2016 |
| CN | 205493612 U | 8/2016 |
| CN | 106235909 A | 12/2016 |
| CN | 107411590 A | 12/2017 |
| CN | 208590932 U | 3/2019 |
| CN | 110547702 A | 12/2019 |
| DE | 20301283 U1 | 3/2003 |
| EP | 1201169 A2 | 5/2002 |
| EP | 2844117 B1 | 7/2016 |
| EP | 3381340 A1 | 3/2018 |
| FR | 2388502 A1 | 11/1978 |
| GB | 2501499 A | 4/2012 |
| GB | 2550585 A | 5/2016 |
| JP | 201094020 A | 9/2010 |
| KR | 20120000451 U | 1/2012 |
| KR | 101497218 B1 | 2/2016 |
| KR | 101681896 B1 | 12/2016 |
| KR | 20170098611 A | 8/2017 |
| WO | 2013160654 A1 | 10/2013 |
| WO | 2015090086 A1 | 6/2015 |
| WO | 2017203237 A1 | 11/2017 |
| WO | 2018108804 A1 | 6/2018 |
| WO | 2019070629 A2 | 4/2019 |
| WO | 2019079220 A1 | 4/2019 |

OTHER PUBLICATIONS

"Black & Decker JW200 Lids Off Automatic Jar Opener", website http://salestores.com/bldejwliofau.html 3 pages, Dec. 30, 2019.

Extended European Search Report for co-pending European Patent Application No. 21795947.7, dated Mar. 18, 2024, 8 pages.

Chinese Office Action for co-pending CN202180046745.X, 10 pp., Mar. 25, 2025.

* cited by examiner

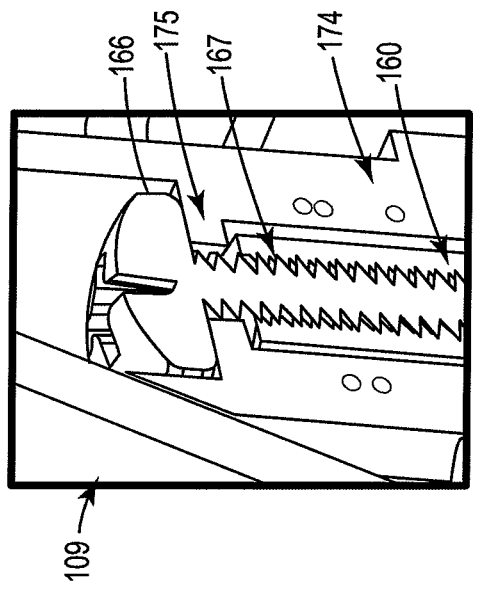
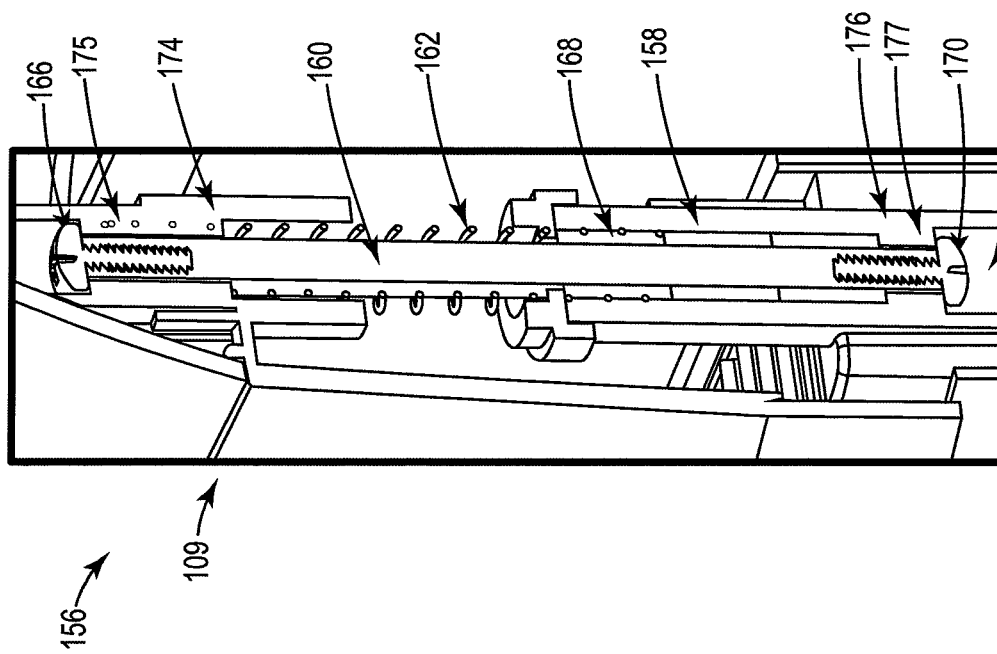

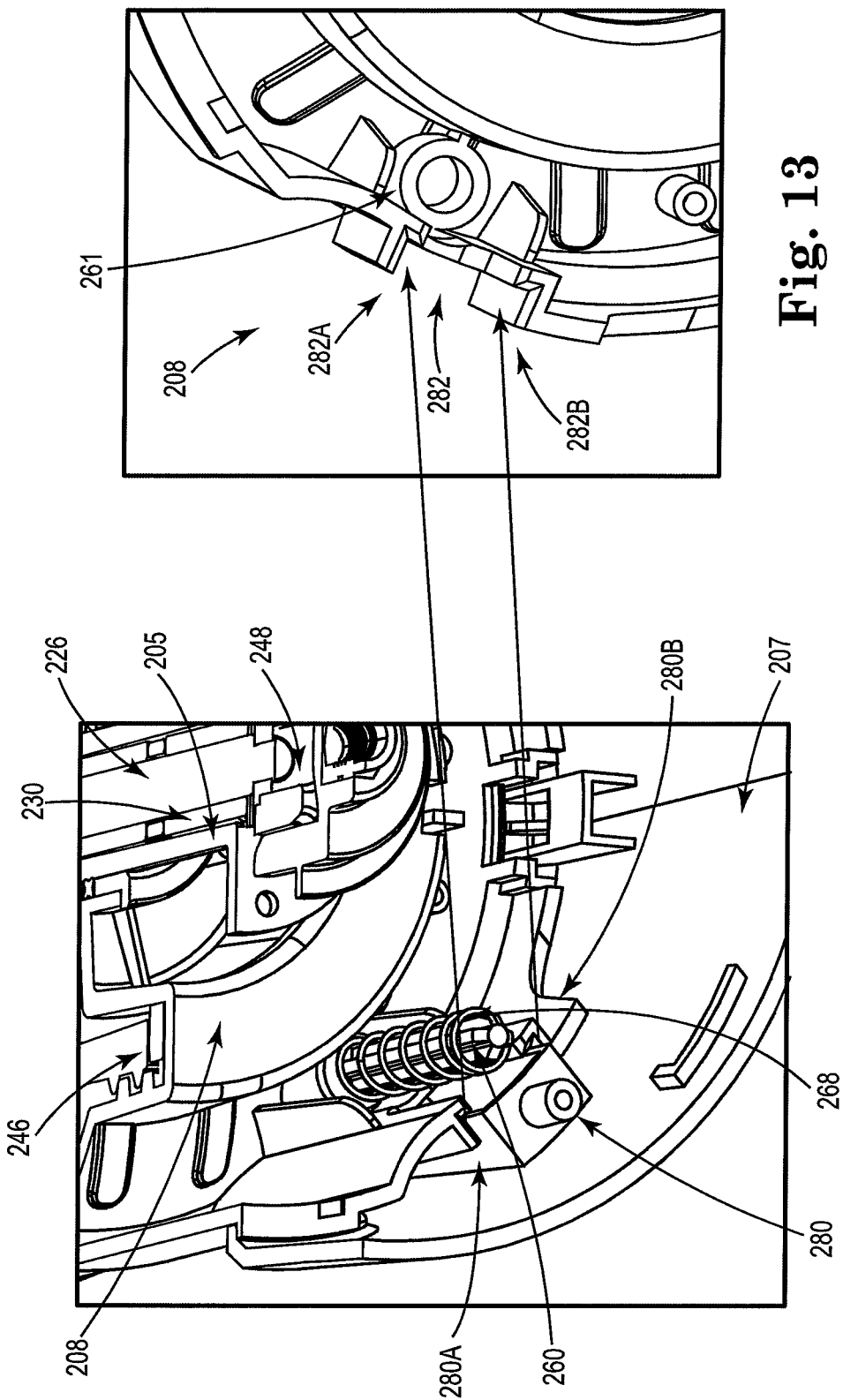

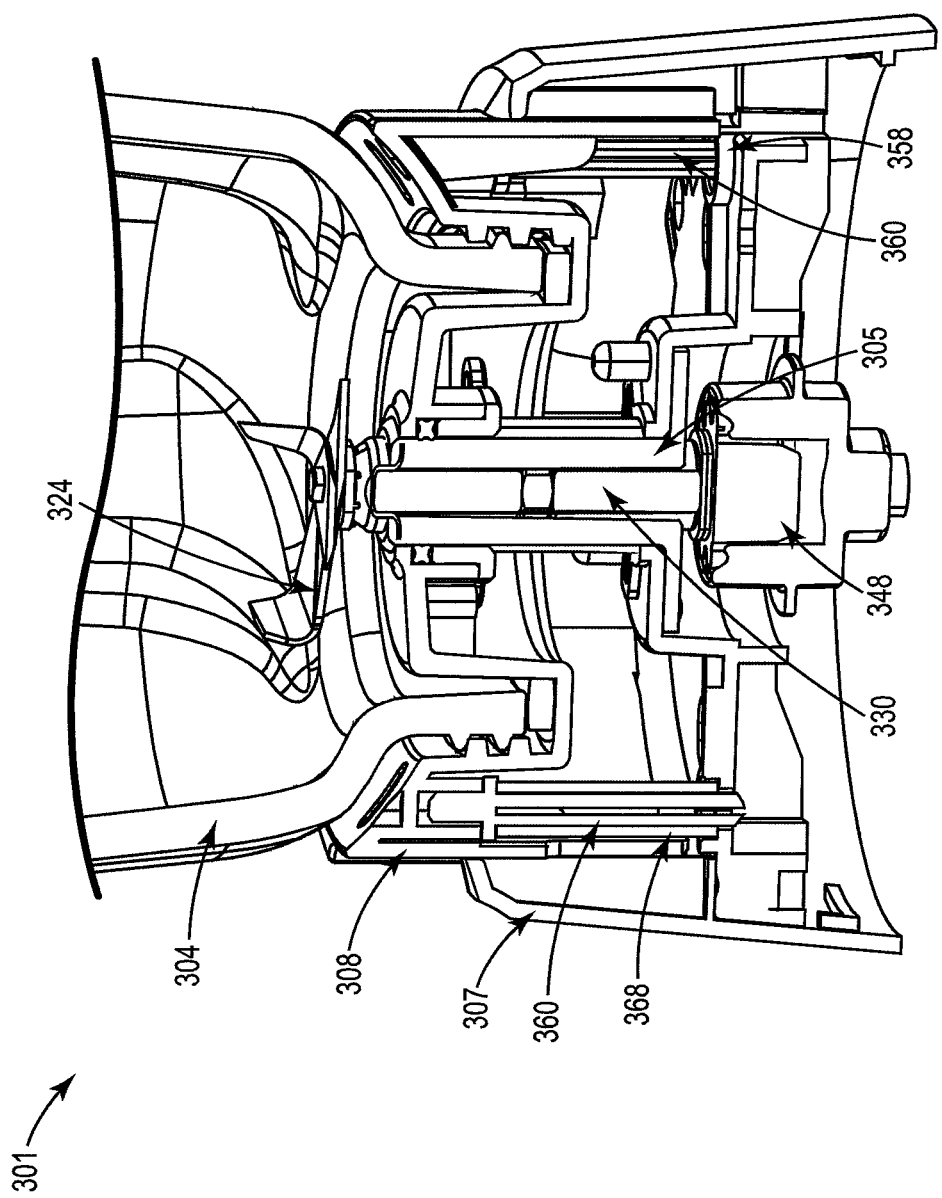

ANTI-CAVITATION BLENDER WITH VERTICAL JAR ACTUATION

PRIORITY CLAIM

This application claims priority to International Application No. PCT/US2021/030151, filed on Apr. 30, 2021, which in turn claims the benefit of U.S. Provisional Patent Application No. 63/018,000, filed Apr. 30, 2020, entitled "ANTI-CAVITATION BLENDER WITH VERTICAL JAR ACTUATION," the disclosures of which are hereby incorporated by reference in their entireties for all purposes.

TECHNICAL FIELD

The present application relates to appliances and method for food preparation and mixing, and in particular relates to food processors or blenders including enhanced features and technologies for more uniform processing or blending.

BACKGROUND

Food preparation appliances such as blenders and food processors are commonly used to process foods, such as by chopping, crushing, cutting, liquefying, blending, mixing, etc. Such appliances typically have a container, such as a jar, in which the food is loaded for processing. The jar has one or more rotatable blades disposed within the jar. When the jar is set on a base that houses a drive motor, the drive motor is drivingly connected to the one or more rotatable blades in the jar. A lid is typically placed on the top of the jar to close the jar during operation of the appliance.

During typical blender operation, there are several factors that can affect the blending performance, including blender design features such as design of the blade and jar, but also motor speed and power. Characteristics of the ingredients to be blended also affect blending performance. Typical blenders are designed for all-around blending performance, but there are specific types of recipes that are more difficult for all blenders to blend, and with which cavitation can occur.

In some blenders and food processors, the contents in the jar tend to rotate about the inner volume of the jar during processing. However, the contents are not always evenly mixed. Often times, for example, the contents nearest the blades may be liquefied, whereas contents located further from the blades remain intact (e.g., chunky). At times the blades may spin freely without contacting or blending a sufficient amount of contents in the jar.

The one or more blades of the appliance may also be shaped so as to impart both a rotational force and an axial force to the contents of the jar during blender operation. For example, some blades are upwardly or downwardly angled to force the contents upward/downward as the blades strike the contents (e.g., the food), causing axial flow of the contents within the jar. However, performance of the blades can vary with the speed at which the blades are rotated and the contents that are being mixed. In some instances, for example, excessive blade rotation speeds may induce cavitation within the contents being processed, or cause the contents to be forced upward and out of the top of the jar (or may contact a cover if equipped). Cavitation of the contents within the jar may also cause non-uniformity in the final mixture and thus reduce the efficiency and usefulness of the appliance.

Cavitation is the creation of an air pocket around the blades, which causes a stalled flow of ingredients and oftentimes requires the consumer to stop the blender and stir the ingredients to re-gain proper blending and flow of the ingredients. Blender tampers are sometimes designed for and included with some blender models and allow the consumer to safely stir and agitate the blending mixture from the top, while the blender is in operation, but these may not always be used by the consumer and may not be easily accessible when cavitation occurs during blending, causing the consumer to either search for the tamper or stir or shake the ingredients by other means.

As such, a need exists for a food preparation appliance that provides improved, convenient, intuitive, and easy to use anti-cavitation features.

SUMMARY

Aspects of the invention described herein provide a food preparation appliance, such as a blending, mixing, or food processing appliance, that allows for rotatable blade movement relative to a jar holding contents. For example, a vertical or axial movement of the blade relative to the jar, or vice-versa. Disclosed aspects provide the consumer with an intuitive and proactive way of preventing cavitation and improving the blending performance by allowing the user to manually and indirectly physically agitate the mixture with an up and down motion of the jar during a blending operation. This option for manual operation is part of the disclosed blender design, so is always and conveniently available to the consumer as an anti-cavitation method. This ergonomic configuration avoids the need for additional parts or complex engagement of the anti-cavitation features.

This disclosure preferably provides for biased vertical actuation of a blender jar with regards to the blender blade during the blending operation or before or after blender use. The jar assembly provides for the blade and blade drive assembly to travel up and down along the central drive axis of the jar assembly, and preferably includes one or more springs or other compressible, biasing component to return the jar and blade drive assembly to a starting position when the consumer is not performing the vertical actuation process.

Embodiments of the disclosure described a blender that includes a base unit and housing that also allows for vertical, downward jar actuation while the jar assembly is mounted to the base unit, while also ensuring that a motor drive train within the base unit remains coupled to the blade drive assembly during operation.

This disclosure provides advantages over other existing blended ingredient agitation methods. For example, the disclosed apparatus is safer, quicker, and always immediately ready for use since it is a feature of the appliance. When doing other agitation methods such as stirring with a tamper, an added step to locate the tamper and to insert it through the lid opening for ingredient agitation may be required. For existing blenders that do not include a tamper, the added step of turning off the blender is also required before stirring, as stirring the mixture while the blender is in operation is not available unless done with a tamper.

The integrated agitation method with the described invention allows for very quick, easy, safe and intuitive agitation of the blended ingredients while the blender is in operation if desired.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIG. 7 is a detailed view of a linear strut unit partially in cross section with a stationary slide surface and a movable component for use with the blender of FIG. 1, according to various embodiments.

FIG. 8 is a detail view of a fastener arrangement partially in cross section used to connect the linear strut unit of FIG. 7 to an upper strut retention mount, according to various embodiments.

FIG. 12 shows various sliding components of a linear strut unit of the blender jar assembly of FIG. 9, according to various embodiments.

FIG. 13 shows an upper blender jar collar linear strut unit connection point and features of the blender of FIG. 9, according to various embodiments.

FIG. 14 is a perspective cross-sectional view of a third embodiment of a lower portion of a blender jar assembly with integrated linear strut units in a static position, according to various embodiments.

DETAILED DESCRIPTION

Figure 1:
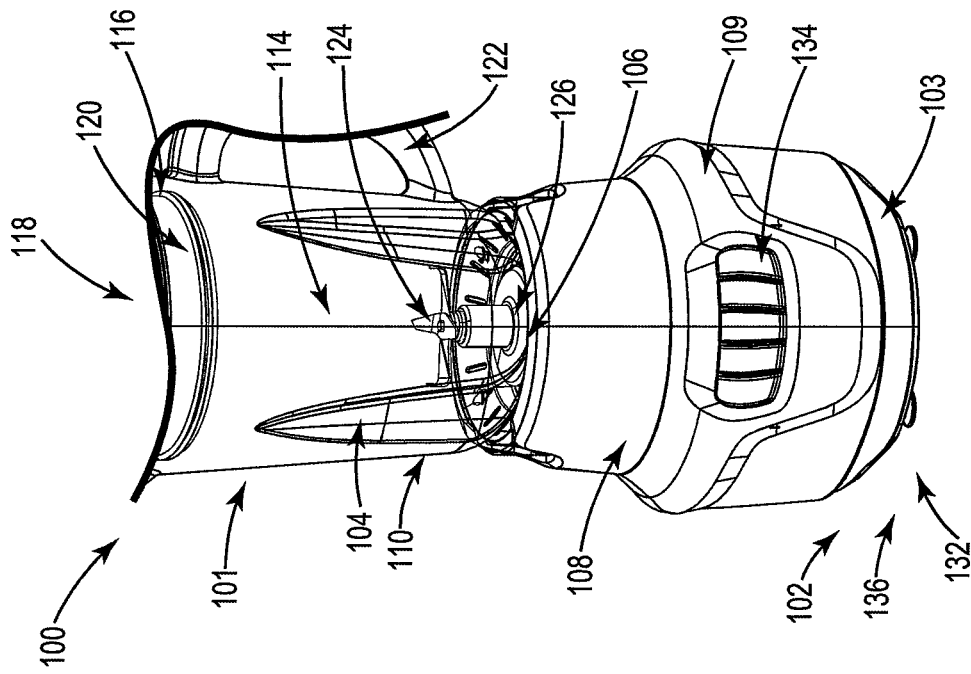
FIG. 1 is a front perspective view of a food preparation appliance illustrated in the form of a blender in a static position.
Figure 2:
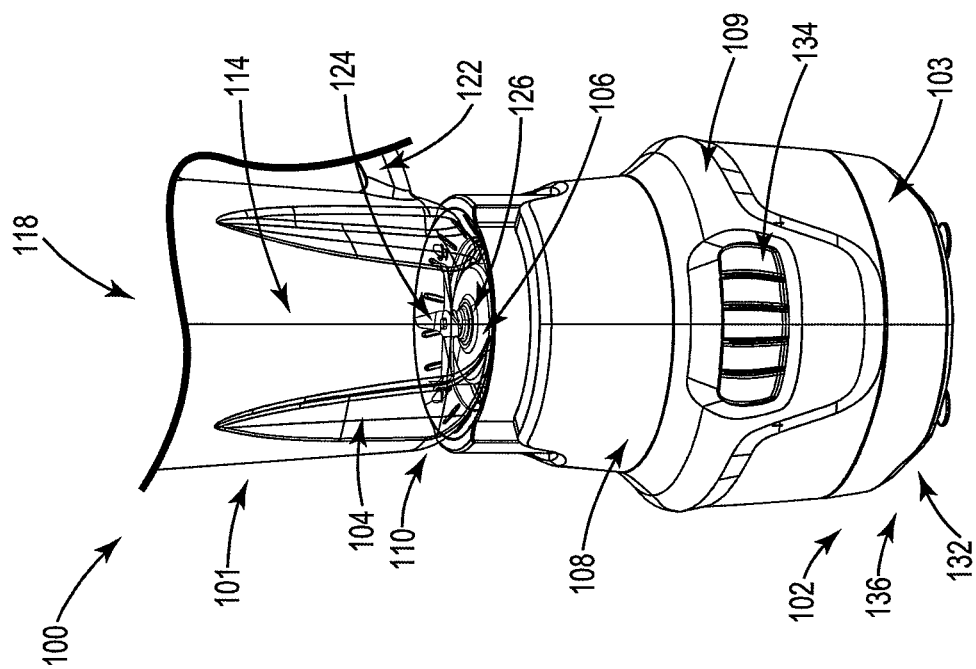
FIG. 2 is a front perspective view of the blender of FIG. 1 in a vertically compressed position.

Referring to the drawings, and initially to FIGS. 1 and 2, one embodiment of a food preparation appliance, such as a blending or mixing appliance, is indicated generally at 100 and is illustrated in the form of a blender. The blender 100 comprises a base unit 102 comprising a motor unit 138, the base unit 102 also configured to support a jar assembly 101 comprising a jar 104. The jar 104 has a blade 124 fitted within and operatively coupled to a driven shaft 126. The jar assembly 101 and/or base unit 102 operate to allow the jar 104 to move up and down relative to the jar blade 124 (or vice-versa) and driven shaft 126. The motor unit 138 can selectively rotate the blade 124 and driven shaft 126 of the jar assembly 101, before, during, or after the jar 104 is vertically actuated.

The blender 100 is shown in two different operative positions. FIG. 1 shows the blender 100 with the jar assembly 101 in a static position, and FIG. 2 shows the blender 100 with the jar assembly 101 in a vertically and downwardly compressed position.

FIG. 1 shows a base unit 102 that comprises a lower housing 103 and an upper housing 109, and FIG. 2 shows less of the lower housing 103 as the upper housing 109 covers more of the lower housing 103 during vertical actuation of the blender as described below. Relative vertical movement of various components between the static and vertically compressed positions can provide benefits for blending, such as anti-cavitation improvements. In particular, when the blender 100 is in the compressed position as shown in FIG. 2, the blade 124 moves vertically relative to a bottom portion 106 of the jar 104, and a contents of the jar 104 is agitated by the vertical movement of the jar 104 relative to the blade 124. Thus, the jar bottom portion 106 is manually movable relative to the blade 124, which preferably remains fixed during jar 104 movement as the blender 100 is vertically actuated. With the blender 100 in the static position as shown in FIG. 1, the blade 124 is oriented at its low position in the jar 104 relative to a bottom portion 106 of the jar 104. Likewise, with the blender 100 in the fully compressed position as shown in FIG. 2, the blade 124 is oriented at its high position in the jar 104 relative to the bottom portion 106 of the jar 104.

The jar 104 is part of the jar assembly 101 that rests on top of the upper housing 109 of the base unit 102. The bottom portion 106 of the jar is preferably shaped to releasably rest upon the upper housing 109 of the base unit 102. The jar 104 preferably includes a handle 122 for use in gripping and manipulating the jar 104. The jar 104 may also have a spout (not shown) formed generally at its upper rim 116 to facilitate pouring out the contents of the jar 104 after processing. In some embodiments, a sidewall 110 of the jar 104 tapers outward in cross-sectional dimension from the bottom to the top of the sidewall, such that a cross-sectional dimension measured across the jar 104 at the rim 116 thereof is greater than a cross-sectional dimension measured across the jar where the sidewall 110 transitions to a bottom portion 106, which can be removable from the jar 104 in various embodiments. Such taper may improve blending of the contents therein, and also improves the ease of manufacturing the jar 104. The upper rim 116 of the jar 104 can be generally circular (the optional spout notwithstanding). It is understood, however, that the jar 104 may be of uniform cross-section along the height of the sidewall 110, or may have a non-uniform cross-sectional dimension other than as illustrated in FIGS. 1 and 2 without departing from the scope of this invention. The jar 104 may be constructed of any suitable material including, without limitation, plastic, glass, metal, metal alloys, composites and combinations thereof. The jar 104 can include a cover 120 removably attached to the upper rim 116 as shown in FIG. 2.

A static position of the base unit 102 shown in FIG. 1 can correspond to a default resting position of the blender 100. As shown, the base portion 102 is in the static position and is uncompressed. The blender 100 moves from the static position of FIG. 1 to the vertically compressed position of FIG. 2 as a user pushes down on the jar assembly 101, which transfers the user's downward force to the upper housing 109 of the base unit 102 as it compresses. When the user releases the jar assembly 101 of the blender 100, the base unit 102 then preferably returns to the static position from the compressed position. Any movable part of the blender 100, such as the jar assembly 101 or the upper housing 109, can be configured to receive a downward force from the user directly or indirectly according to various embodiments.

Figure 5:
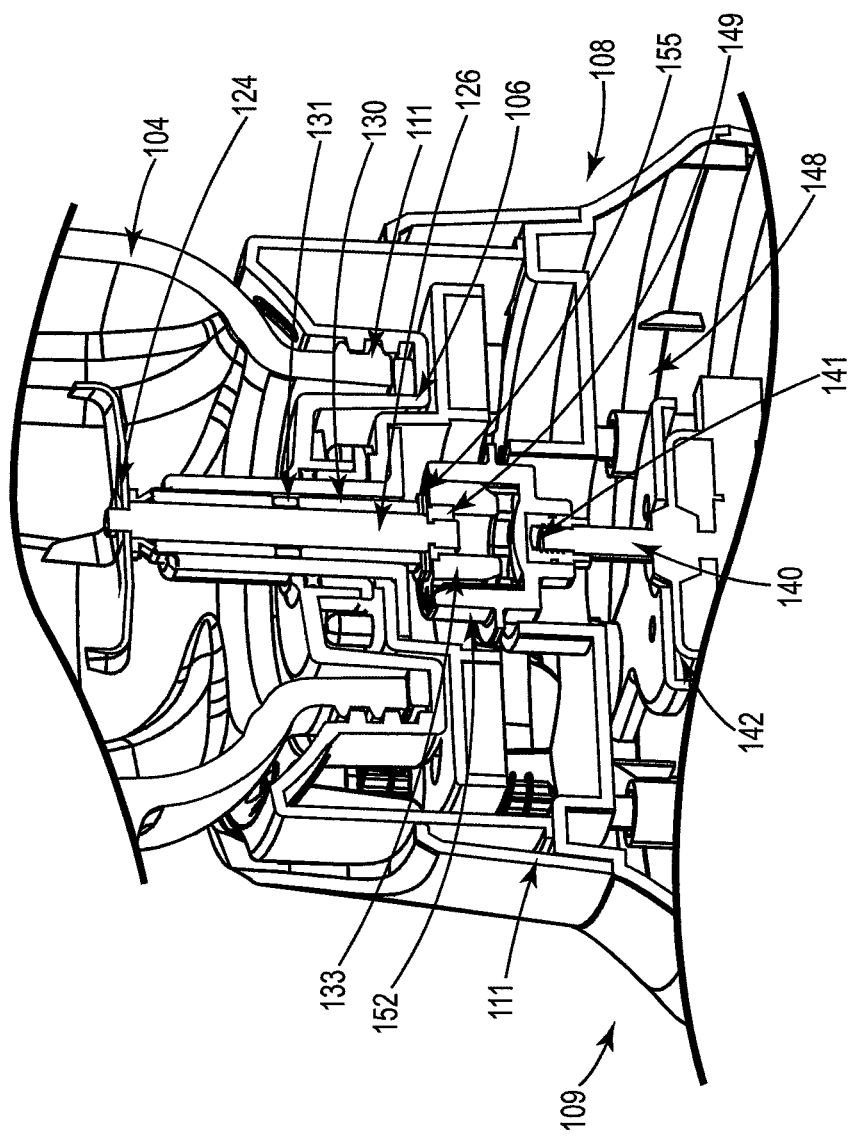
FIG. 5 is yet another cross-sectional view of the blender of FIG. 1, showing various operative components, according to various embodiments.
Figure 6:
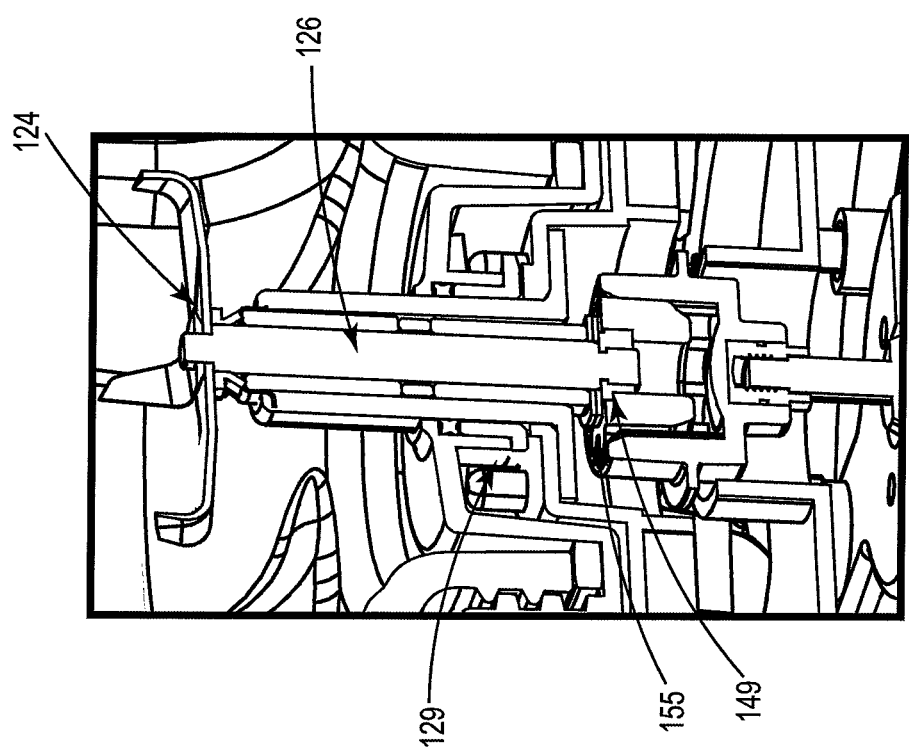
FIG. 6 shows a blade, driven shaft, related components partially in cross section for use in the blender of FIG. 1, according to various embodiments.

With reference to FIGS. 1 and 2, the rotatable blade 124 is operatively connected to a vertically oriented driven shaft 126. Preferably, the driven shaft 126 passes through an aperture in the bottom portion 106 of the jar 104. As shown in FIG. 5, the bottom portion 106 of the jar 104 is preferably provided with a driven shaft guide portion that is fitted with a bearing 130 (FIG. 5) that guides and supports the driven shaft 126, including during sliding axial movement of the jar 104. The blade 124 is selectively rotatable relative to the jar 104 in a clockwise or counterclockwise rotational direction as driven by the motor unit 138. The jar 104, including the bottom portion 106, is preferably vertically movable by a user relative to the blade 124 and driven shaft 126 so as to allow for a manual agitation of the jar 104 and contents therein in order to improve blender 100 performance and/or reduce cavitation within the jar 104.

Figure 4:
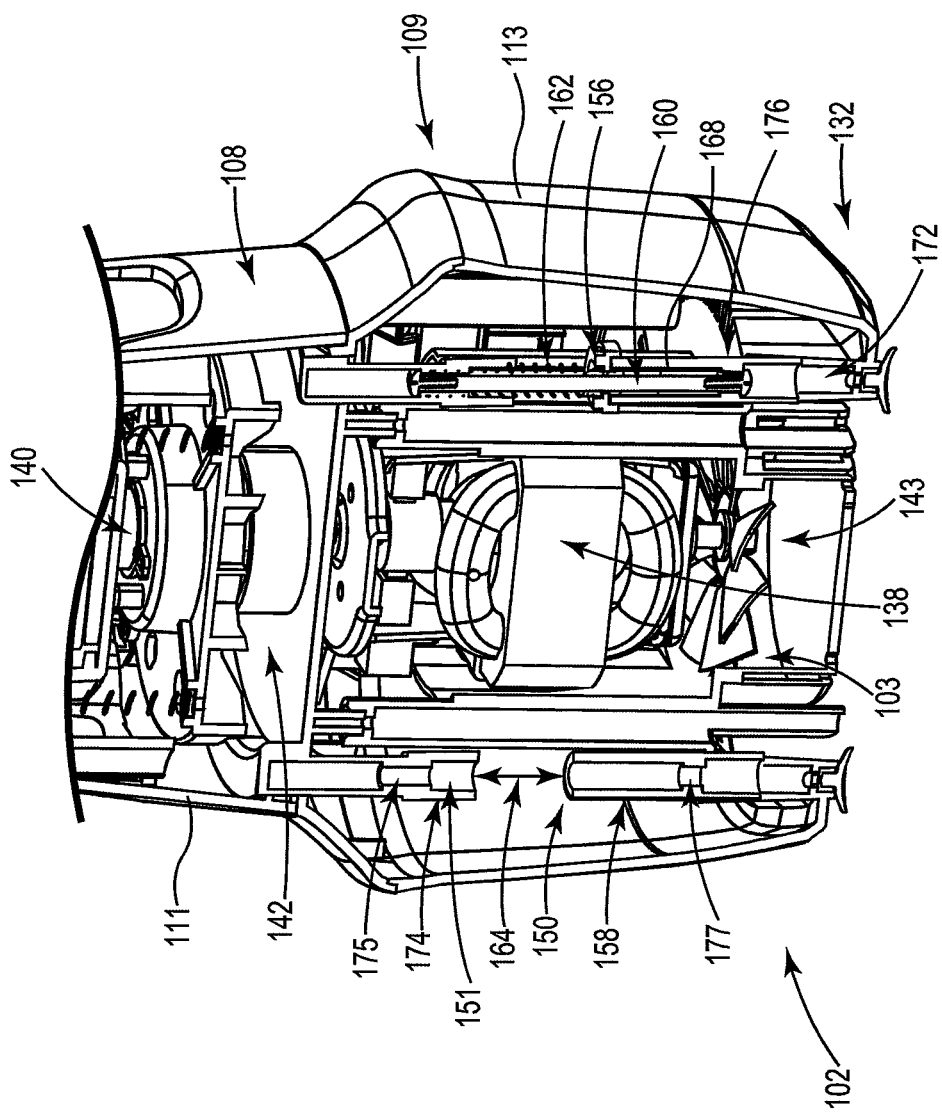
FIG. 4 is another cross-sectional view of the blender of FIG. 1, showing various operative components, according to various embodiments.

The base unit 102 preferably supports and positions the jar assembly 101, and operatively controls and powers the blade 124 rotation during blending. As shown in FIG. 4, the base unit 102 comprises an upper housing 109 and a lower housing 103. The lower housing includes a floor portion 132 to sit on any use surface, and preferably plural stationary support portions 150, each of which can comprise a stationary component 158 defining a slide surface 168 of a lower strut retention mount 176, described below. The lower housing 103 preferably houses and supports the drive motor unit 138 therein that is configured to selectively rotate a motor drive shaft 140, which is preferably releasably operatively connected to the driven shaft 126 of the jar assembly 101, as described below. Therefore, the motor unit 138 of the base unit 102 is preferably a stationary component of the lower housing 103 and is configured to operatively rotate the blade 124 during blender 100 operation. The motor unit 138 can also optionally rotate a coaxial motor cooling fan 142 directly driven at the rotational speed of the motor unit 138. The jar assembly 101 is configured to be positioned on top the upper housing 109 of the base unit 102. In preferable embodiments, various components of the jar assembly 101 are releasably interfaced with the upper housing 109 of the base unit 102.

The upper housing 109 of the base unit 102 is configured to move relative to the lower housing 103 so that the jar 104 when supported on the upper housing 109 move together relative to the lower housing 103. As the motor 138 is fixed to the lower housing 103, the motor unit 138, its drive shaft 140, and the driven shaft and blade of the jar assembly 101 remain stationary in the axial direction of the drive shaft 140 relative to an axially moving upper housing 109 and jar 104. The upper housing 109 is preferably shaped to fit above and mostly around the lower housing and can comprise one or more components. The upper housing 109 provides an engagement portion 111 onto which the jar assembly 101 can rest, and includes structure that creates a skirt portion 113 for surrounding most of the lower housing 103 and to move or slide relative to the lower housing 103. Internal structure of the upper housing 109 preferably provides a like number of movable support portions 151 as there are stationary support portions 150. The movable support portions 151 are more preferably aligned axially with the stationary support portions 150 so that linear struts 156 can be fit between them to allow for axial movement as described in more detail below. The movable support portions 151 are movable in that they move along with the upper housing 109 relative to the stationary supports 150 of the stationary lower housing. Preferably also, the movable support portions 151 are formed integrally with at least one internal component of the upper housing 109.

As shown in FIG. 4, the jar assembly 101 preferably also comprises a generally annular jar collar 108 that can be sized and shaped in a complementary manner as the engagement portion 111 of the upper housing 109 so that the annular collar and thus the entire jar assembly 101 can be selectively removable and separable from the engagement portion 111 of the upper housing 109 of the base unit 102, e.g., by lifting in the axial direction The upper housing 109 can be formed of one or more parts and/or components. The upper housing 109 of the base unit 102 also preferably provides one or more external surfaces such as surrounding the lower housing 103 and can be used for mounting user controls 134 and/or displays, and or other features to the base unit 102 of the blender 100 in various embodiments.

A separable drive connection 148 preferably provides an operative rotary connection between the drive shaft 140 of the base unit 102 and driven shaft 126 of the jar assembly 101, respectively. The separable drive connection 148 preferably permits axial separation, e.g., when the jar assembly 101 is removed from the base unit 102. When interfaced with the upper housing 109 of the base unit 102, the jar assembly 101 comprises the driven shaft 126 (to be driven by the drive shaft 140) that is positionable for operative connection with the drive motor unit 138 for use by the separable drive connection 148 comprising a driven shaft input coupling 133 and a drive shaft output coupling 152. The driven shaft 126 preferably comprises the coupling 133 on a lower end thereof that is opposite an upper end attached to the blade 124. The separable drive connection 148 can be located outside of and below the jar 104 and preferably rotationally connects the driven shaft 126 to the drive shaft 140 when the jar assembly 101 is interfaced with the base unit 102.

Figure 3:
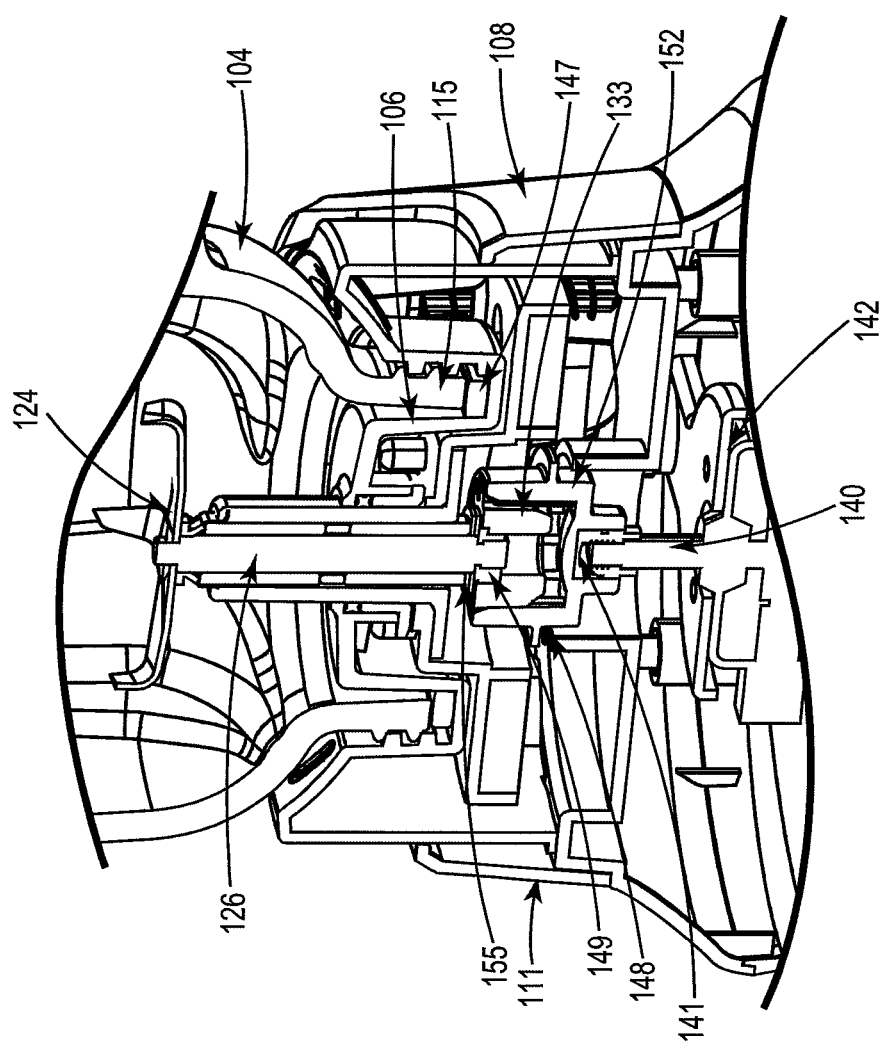
FIG. 3 is a cross-sectional view of a portion of a jar assembly and base unit of the blender of FIG. 1, showing various operative components, according to various embodiments.

With reference to FIGS. 3 and 5, the jar collar 108 of the jar assembly 101 is threadably attached to the jar 104 by jar collar threads 115 that preferably interface with complementary external jar threads (not shown) of the jar 104. The jar collar 108 is an annular member that is securely attachable to the jar 104 of the jar assembly 101, e.g., for positioning and/or stabilization of the jar 104 on the base unit 102. For example, the bottom portion 106 can be integral to the jar collar 108, but as shown is attachable to the jar 104 by way of the jar collar 108 when threaded to the jar 104. The jar collar 108 is preferably located proximate to the bottom portion 106 of the jar 104. The jar collar 108 is preferably configured to fit to the upper housing 109 of the base unit 102. When the jar assembly 101 is removed from the base unit 102 and the upper housing 109, the jar collar 108 preferably extends below shaft 126 at rest position to prevent tipping when the jar assembly 101 is removed from the base unit 102. Alternatively, the driven shaft 126 can move up within the jar collar when the jar assembly 101 is placed on a flat surface.

In FIG. 3, the bottom portion 106 of the jar 104 comprises an opening therein for receiving and supporting the driven shaft 126. A driven shaft bearing 130 and a driven shaft seal 131 (see FIG. 5) is preferably located between the bottom portion 106 and the driven shaft 126. The bottom portion 106 can be fitted below a jar seat seal (a gap for which is shown by jar seat recess 147 in FIG. 3) and a circumferential sidewall 110 extending up from the bottom portion 106 of the jar 104 so that the bottom portion 106, cover 120, and sidewall 110 together define an interior space (broadly, a processing chamber) 114 of the jar 104. The sidewall 110 terminates at an upper rim 116 to define an opening 110 at the top of the jar 104 through which food or other contents to be processed are loaded into the interior space 114 of the jar 104. The bottom portion 106 has a central opening therethrough shown in FIG. 3 for the bearing 130 when installed as shown in FIG. 5 The bearing 130 facilitates rotational movement of the driven shaft 126 relative to the bottom portion 106 and also allows the driven shaft 126 to move axially relative to the jar 104.

With reference to FIG. 5, the driven shaft seal 131 is preferably supported within a recess surrounding the opening through the bottom portion 106. The driven shaft seal prevents leakage from the interior space 114 of the jar 104 during rotational movement of the driven shaft as it is driven by the motor unit 138 and the drive shaft 140 and during axial movement of the jar 104.

As described herein, the jar assembly 101 is removably positionable atop the upper housing 109 of the base unit 102. The jar assembly 101 is removable from the base unit 102, such as by lifting the jar assembly 101 off the upper housing 109 of the base unit 102. The jar assembly 101 is therefore preferably a removable assembly that comprises the jar 104, the bottom portion 106, the jar collar 108, the blade 124, the driven shaft 126, the driven shaft input coupling 133, the driven shaft bearing 130, the driven shaft seal 131, a shaft spring (not shown), a shaft spring seat 155, and a drive connection seal 149. As a user removes the jar assembly 101 from the base unit 102, all the jar assembly components are preferably removable together.

In some examples, one or more ball bearings may be used for the shaft seal 149, which preferably substantially prevents the shaft spring and shaft spring seat 155 from spinning when the driven shaft 126 is rotated during blender 100 operation. A shaft spring (not shown) can surround the driven shaft 126 and can be conical in shape. Such a shaft spring can be seated between the shaft spring seat 155 and a bottom surface of the bottom portion 106 or another functional component movable with the bottom portion 106.

A shaft spring can be provided, such as operatively between the spring seat 155 and the bottom portion 106, for pushing the driven shaft input coupling 133 away from the bottom portion 106 so that the coupling 133 is presented in alignment to be received by the drive shaft output coupling 152 when the jar assembly 101 is properly positioned on the base unit 102. Together, the linear struts 156 and any shaft spring preferably would work together to vertically bias the blender jar 104 upward to the static (resting) position as shown in FIG. 1.

Bearings, bushings, and/or seals within jar assembly 101 relative to shaft 126 may experience axial and radial forces due to movement of the jar 104. According to various embodiments, bearings used throughout and herein can include ball bearings, journal bearings, lubricated bearings, plastic washers, among various other bearing and seal types and compositions.

As noted above, one or more linear guide components can be used to maintain alignment of the upper housing 109 to the lower housing 103 during movement as described above and preferably also to axially bias the upper housing 109 away from the lower housing 103 as shown in FIG. 4. Examples of linear guide components include linear strut units 156, which are preferably integrated into the base unit 102, and operatively connect the upper housing 109 to the lower housing 103 of the base unit 102 such that a movable component 160 is operatively connected to the jar assembly 101 and the movable component 160 moves relative to a stationary guide surface 168, e.g., a bearing surface, of stationary component 158. The linear strut units each preferably include a compression-type biasing spring 162 that urges the upper housing 109 away from the lower housing 103 as described in more detail below.

As shown in greater detail with reference to FIG. 7, the one or more linear strut units 156 preferably define a stationary guide surface 168 for guiding a movable component 160 in a direction of extension of the drive shaft 140. The movable component 160 is preferably operatively connected to the jar assembly 101 when positioned on the upper housing 109 so that the driven shaft 126 and thus the blade 124 remain stationary relative to the stationary guide surface 168 as the jar 104 and the movable component 160 move in the axial direction of the extension of the drive shaft 140.

Each linear strut unit 156 can preferably provide both a biasing feature and an alignment, guide feature. Preferred examples of the linear strut units 156 have a substantially linear compression. The compression of the linear strut units 156 can correspond to an axial movement of blade 124 within and relative to the jar 104 that imparts an anti-cavitation blade movement relatively to the jar 104 as described herein. As described with reference to FIGS. 3-5 in particular, the linear strut units 156 can be housed within the base unit 102 thus operatively providing the axial movement to the jar 104 by the arrangement of the base unit 102. Other alternative embodiments where the operative relative movement is provided outside of the base unit 102 are described below.

Each linear strut unit 156 preferably comprises the compressible biasing spring 162 positioned between one of an upper retention mount 174 of the upper housing 109 and one of a lower retention mount 176 of the lower housing 103. Such upper and lower retention mounts are preferably formed integrally with the upper and lower housings 109, 103, respectively. Each movable component 160 is preferably a rod that is fixed with one of the upper retention mounts 174 and that is movable relative to one of the lower retention mounts as the rod (as the movable component 160) slides along a bearing surface of one of the stationary components 158. Various springs, e.g., shaft spring and/or one or more springs 162 comprised within one or more linear guide components, such as linear strut units 156 of FIG. 4, The compressible springs 162 compress as the jar 104 and thus the upper housing 109 are subject to a downward force toward the lower housing 103 and they expand back to their non-compressed state (or as close as they can under the weight of the upper housing, jar assembly 101 and any food within the jar 104) when the downward force is removed.

As shown, the linear strut units 156 are vertically-oriented, journaled, and spring-loaded struts that are aligned with the drive shaft 140 and function as a upward biasing (vertically oriented away from a floor portion 132 of base unit 102) and guide rail feature of the jar assembly 101 and assist in aligning the upper housing 109 of the base unit 102 to the lower housing 103. The linear strut units 156 also preferably control and guide vertical movement of the blade 124 on shaft 126 within the jar 104.

As discussed above, each linear strut unit 156 preferably defines a stationary guide surface 168. Each stationary guide surface 168 preferably includes one or more guide bearings or bushings positioned within a stationary component 158 attached to lower strut retention mount 176 of the lower housing 103, for guiding a movable component 160 in the direction of extension of the drive shaft 140 (see FIG. 5). Each movable component 160 can be a guide rail or rod in various embodiments that slides inside one or more of the stationary guide surfaces 168. The movable component 160 is operatively connected to the jar assembly 101 (see FIG. 4) so that the driven shaft 126 and thus the blade 124 remain stationary relative to the stationary slide surface (e.g., stationary component 158 and/or guide surfaces 168) as the jar assembly 101 and the movable component 160 move in the direction of the extension of the drive shaft 140. The bearing of 130 as provided to the bottom portion 106 of the jar 104 preferably permitting sliding movement of the driven shaft 126 relative to the bottom portion 106.

Each linear strut unit 156 can include a movable component 160 and a stationary component 158 that move relative to each other during relative movement. As an example of one of the movable components 160, a guide rail or rod is shown, and an example of one of the stationary components, a sleeve 158 with a guide surface 168 is shown. The movable component 160 can be operatively connected to the jar 104 via one of the upper strut retention mounts 174. The upper strut retention mount 174 can include a narrowed upper neck portion 175. A fastener 166 can attach the movable component 160 to the upper strut retention mount 174 through the upper neck 175 using threads 167 or any other suitable attachment or fastener. A lower end of the movable component 160 is slidably interfaced with the guide surface 168 of or attached to the stationary component 158. The slide surface preferably comprises or more guide bearings fitted to the stationary component 158 or comprised therein, as described above.

Guide surfaces 168, such as guide bearings, are optionally lubricated and preferably reduce binding and provide smooth and repeated compressions. In one preferable embodiment, the guide surfaces 168 are composed of nylon.

In alternative embodiments, the moveable component can be a sleeve and the stationary component can be a guide rail, among other variations.

A stopper 170 is shown attached to a lower end of the movable component 160. As shown, the stopper 170 is a fastener threaded to the movable component 160 and is configured to prevent the movable component 160 from being withdrawn upward or decoupled from a lower strut retention mount 176 of the stationary component 158. Preferably, the stopper 170 does not secure the movable component 160 to the stationary component 158, but provides a sliding guide feature. The lower strut retention mount 176 comprises a lower neck 177 to allow for a secure, guided, and slidable fitment. An opening or recess 172 is located below the stopper 170 when the blender 100 is in the static position as shown in FIG. 1. The stopper 170 and movable component 160 protrude into and along the recess 172 when the blender 100 moves toward the compressed position as shown in FIG. 2.

The movable components 160 can be of various relative and absolute lengths, including shorter or longer than shown. The movable components 160 are preferably long enough to allow for a desired range of movement of the upper housing 109 to the lower housing 103, and longer guide surfaces 168, e.g., that overlap more with the movable components 160, may strengthen each linear strut unit 156. The movable components 160 are preferably vertical and smooth. In linear strut units 156, the movable component 160, such as a guide rail or shaft, and housing 174 and 158 features work together to prevent spring 162 buckling at various stages and levels of compression.

Shown in FIG. 8, the moveable component 160 can include threads 167 for secure connection to fastener 166, or in alternative embodiments the ends of the movable components 160 can be attached to various housing components using barbed plastic components, and/or components with a T-shaped end.

In some examples the linear strut units 156 have a maximum travel from blender static position to compressed position of about 19 mm. However, any distance greater or smaller is also contemplated, such as greater than 19 mm or less than 19 mm. The movement of the blade 124 and linear strut units 156 can be substantially linear and vertical, but in other embodiments there can be at least some horizontal or transverse movement or play, whether intentional or otherwise. For example, a transverse movement of the components of the blender 100 when the blender jar 104 is moved downward by the user, compressing the base unit 102, which can result from a user compressing the various biasing features within the base unit 102. In some preferable embodiments, a downward force of about 12.5 lbs. can be the amount of nominal force required to fully depress the jar 104 and compress the linear strut units 156 and the shaft spring.

An example of the jar 104 with an interior 114 filled with water weighs approximately 6.75 lbs. In other examples, such as with a filled jar 104, a user may apply a force of approximately 5.75 lbs. downward to fully compress the blender jar 104 relative to the base unit 102. In some preferred embodiments, the linear strut units 156 and springs 162 thereof will be at least partially, but not fully, compressed when the blender 100 is in the resting state of static position as shown in FIG. 1.

According to various embodiments fewer springs or other biasing features may be used to provide a compression of the blender 100. The linear strut units 156 or other guide or biasing structures may be four as shown or can be fewer or greater according to various embodiments.

As used herein, direction and/or orientation terms such as lower, upper, bottom and top refer to the upright orientation of the appliance 100 as illustrated in FIG. 1. The term vertical refers to a direction according to the height of the jar 104 and along the drive shaft 140 and driven shaft 126, and transverse refers to a direction normal to the height of the jar 104, e.g., horizontal in the illustrated embodiment of FIG. 1. While in the illustrated embodiment the appliance is in the form of a blender 100, it is understood that the appliance may be in the form of a food processor or other suitable appliance in which a blade operates within the jar 104 to process food or other contents in the jar 104.

As shown in the first embodiment of FIGS. 1-8 described above, the linear strut units 156 allow for a biased movement of the jar assembly 101 relative to the lower housing 103 of the base unit 102. Alternative embodiments shown with reference to FIGS. 9-17 show linear strut units, which allow for biased movement and spring compression entirely within a blender jar assembly, as described in greater detail below. Therefore, various operative structures and components can be changed and modified without departing from the scope of the present disclosure. It is noted that relative movement of one base component to another base component, one jar component to another jar component, one base component to a jar component, and the like are provided in the various embodiments described herein. The present invention is characterized as having a base unit having a stationary portion to locate and drive the blade within the jar at a defined axial position and drive train, and wherein the jar can move in a drive train extension direction, e.g., vertically, relative to the base unit stationary portion.

A second embodiment of a blending appliance as described herein, such as a blender similar to blender 100, is shown and described with reference to FIGS. 9-13. In particular, an alternative jar assembly 201 is shown and described. The components of the jar assembly 201 can be generally similar to the components of the jar assembly 101 of blender 100, with certain notable exceptions discussed below. In particular, the jar assembly 201 includes integrated movement that occurs internally to the jar assembly 201. Although the configuration of the jar assembly 201 departs from some aspects of the jar assembly 101, the overall functionality is nevertheless covered by the present disclosure, including the variations discussed below.

Figure 9:
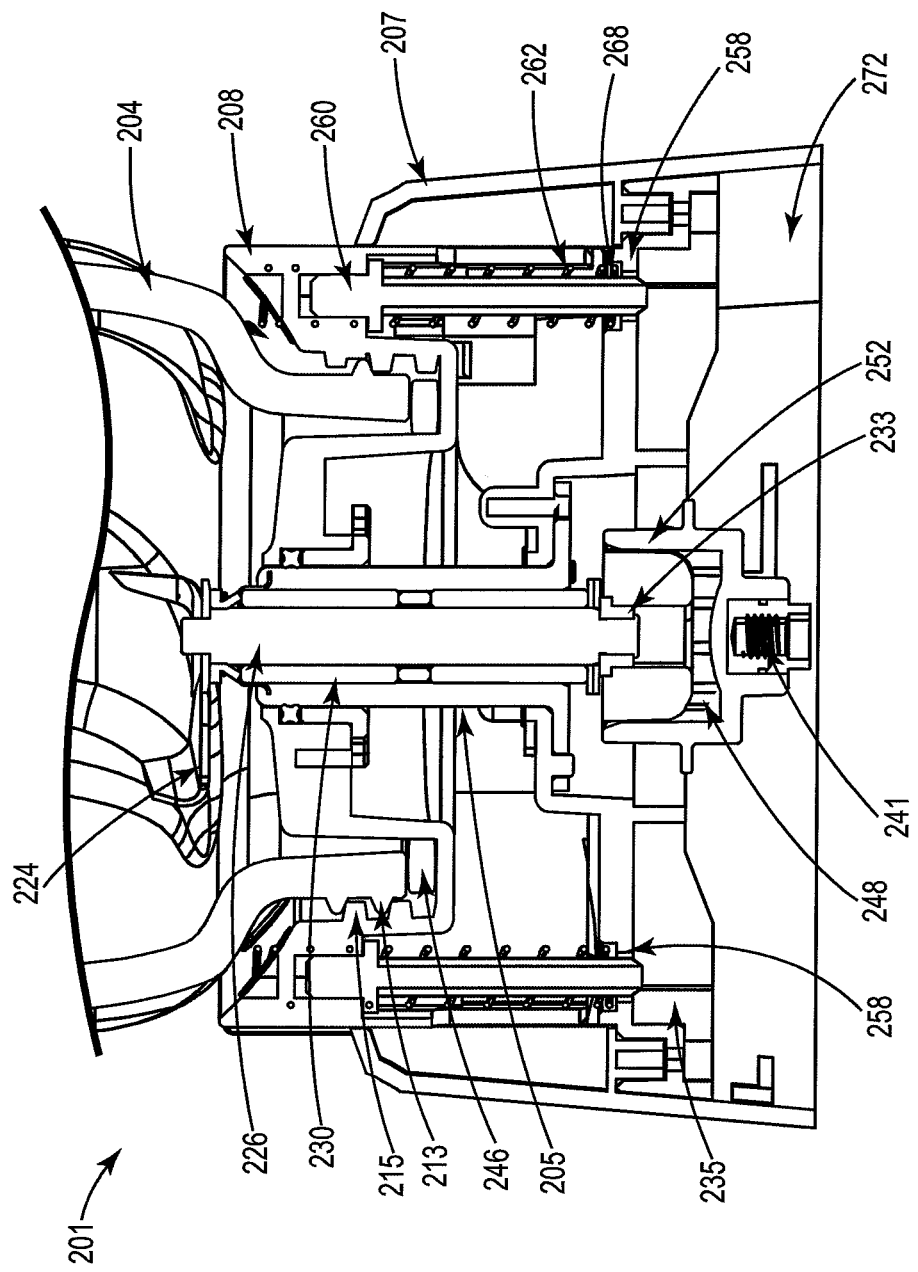
FIG. 9 is a profile cross-sectional view of a lower portion of a blender jar assembly with integrated linear strut units in a static position, according to a second embodiment.

As shown with reference to FIG. 9, and different from the disclosed jar collar 108 of FIGS. 1-8, the jar assembly 201 comprises a jar collar in the second embodiment of FIGS. 9-13 that is a multi-part jar collar that comprises a moving inner jar collar 208 that is attached to the jar 204, and a relatively stationary outer collar 207. The outer collar 207 is fixed with a lower jar assembly frame 235 that together will remain stationary when the lower jar assembly frame 235 is positioned onto a complementary upper feature (not shown) of a stationary base unit (not shown). Such a base unit can be any conventional design so long as it provides a complementary feature for engaging with the lower jar assembly frame 235. A stationary portion of the jar assembly 201 can comprise both the frame 235 and the outer collar 207, which are preferably fixed to or integrated with each other and also comprise support for a driven shaft 226 that can be driven by a drive shaft, such as disclosed above at 140. The driven shaft 226 can pass through a driven shaft guide 205 also fixed with the frame 235 and collar 207 and that permits axial movement of the driven shaft 226 relative to the jar 204. The inner jar collar 208 is moveable relative to frame 235, and permits movement of the jar 204 downward or toward the frame 235 when a user provides a downward, axial force to the jar 204.

The jar assembly 201 in FIG. 9 is shown in the static position, generally corresponding to the static configuration of FIG. 1, described above. As shown, a blade 224 is operatively connected to the driven shaft 226 that is adjacent to aligned by a bearing 230. As shown, the bearing 230 is supported at least in part by driven shaft retainer 205 that remains stationary.

Figure 10:
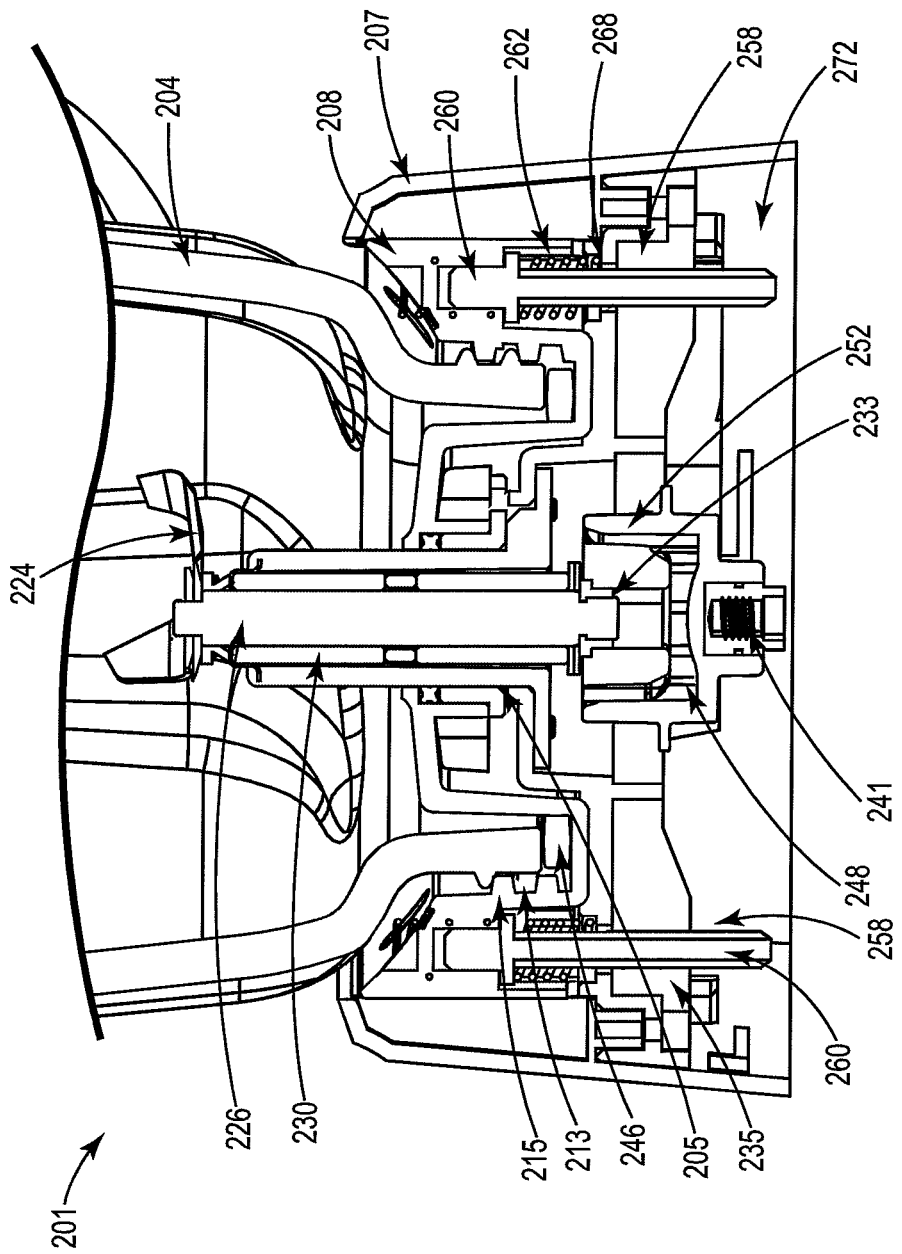
FIG. 10 is a profile cross-sectional view of the blender jar assembly of FIG. 9 with integrated linear strut units in a vertically compressed position, according to various embodiments.
Figure 11:
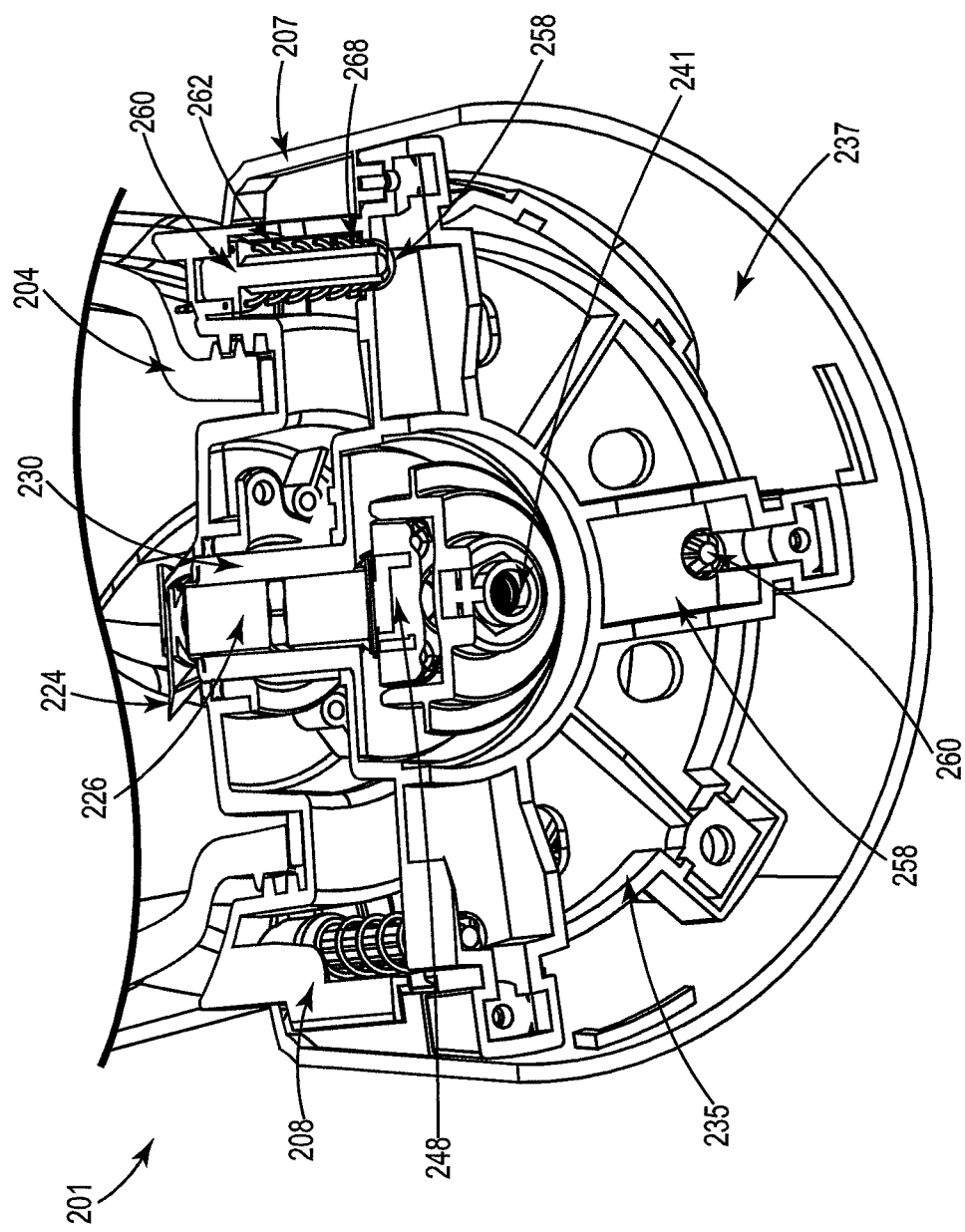
FIG. 11 is a lower cross-sectional view of the blender jar assembly of FIG. 9, according to various embodiments.

The lower jar assembly frame 235 as shown is provided with one or more stationary components 258, which can be formed as a sleeve-like pocket with a guide surface. A movable component 260, as shown in FIG. 9, is fixed with the inner collar 208 and is part of a linear strut similar to linear strut units 156 describe above having a compressible spring 262 urging the inner collar 208 upward to a non-compressed static state of the jar assembly 201. In this static state, the movable component 260 preferably does not protrude past the frame 235 as shown. An opening 272 is provided through a bottom portion of each of the stationary components 258 to allow the movable component(s) 260 to extend downward past the frame 235 when the jar assembly 201 is forced to the compressed position as shown in FIG. 10. FIG. 11 shows the static position of FIG. 9 from a perspective view.

As described herein, the movable component 260 is biased upward by the spring 262, and each movable component 260 is preferably in slidable contact with one or more stationary bushing inserts. Each of the bushing inserts can form a guide surface 268 that is preferably supported within the stationary component 258. Multiple bushing inserts can be stacked to create a taller effective guide surface 268. Various fastening and mounting points of blender jar 104 described above are equally applicable to the second embodiment of jar assembly 201 with integrated movement. Also shown is a jar seat seal 246 that is pressed against a portion of the inner collar 208 when the jar 204 is tightened to the inner collar 208 with a threaded interface between collar threads 215 and jar threads 213, according to the shown embodiment. The jar assembly 201 as shown in FIG. 9 can be fully removable from a corresponding base unit, such as by a user lifting the jar assembly 201.

A separable drive connection 248 can be comparable to the drive connection 148 described above. A driven shaft 226 input coupling 233 as shown is operatively connected to a drive shaft output coupling 252 when the jar assembly 201 is placed on the base unit such that a motor unit drive shaft connected at recess 241 powers the blade 224 through driven shaft 226. FIG. 11 shows a partial cross-section perspective view of the jar assembly 201 in the static position as shown in FIG. 9.

FIG. 10 shows the bottom of the jar assembly of FIG. 9 but with the strut springs 262 compressed. As the jar assembly 201 reaches the compressed state as shown, it has a corresponding movement of one or more movable components relative to one or more stationary components. For example, a movable part of the jar assembly 201 comprises the jar 204 that is connected to an inner collar 208 that moves with the jar, and the inner collar 208 is connected to one or more movable components 260 (e.g., guide rails). As shown, a preferable embodiment of the jar assembly 201 includes relative internal movement, various parts of the jar assembly 201 remain stationary during axial movement, and various other parts remain stationary, e.g., to the corresponding base unit. The movable part of the jar assembly 201 moves axially relative to one or more stationary components. As show, stationary components include the outer jar collar 208, stationary components 256 that include slide surfaces 268 fitting within, and the frame 235. As movement occurs between the movable part and the stationary part of the jar assembly 201, one or more biasing features are compressed or decompressed. For example, biasing spring(s) (e.g., 262) can be fitted around the movable components 260 and configured to bias the inner collar 208 (and any components attached thereto) upward relative to the outer collar 207 (and any components attached thereto) are compressed and the jar assembly 201 moves closer to a motor unit (e.g., motor unit 138 of base unit 102), causing the blade 224 and driven shaft 226 to raise up, relative to the jar 204, and agitating the ingredients in the jar 204 at a higher level than previously. Although the jar 204 moves downward in preferable embodiments, a relative upward movement of the blade 224 can be apparent as the jar 204 is actuated. The movable components 260, as shown, can protrude beyond a bottom of the outer collar 207.

With reference now to FIGS. 12 and 13, various optional details related to the inner collar 208, the outer collar 207, and the slidable interface thereof, which are shown and described in detail herein.

With reference to FIG. 12, a collar guide protrusion 280 is shown attached to outer collar 207. The collar guide protrusion has a first edge 280A and a second edge 280B. A corresponding collar guide recess 282 is shown in FIG. 13 attached to inner collar 208. The collar guide recess 282 can include a first notch 282A and a second notch 282B. The collar guide protrusion 280 and the collar guide recess 282 are configured to slidably stabilize movement of the jar assembly 201 when in operation, and to preferably increase a stability of the jar assembly when in various positions and/or when in use. As shown the first edge 280A of the collar guide protrusion 280 can slidably interface with the first notch 282A of the collar guide recess 282. Likewise, the second edge 280B of the collar guide protrusion 280 can slidably interface with the second notch 282B of the collar guide recess 282. Other structures, guides, and variations are also contemplated herein.

Figure 15:
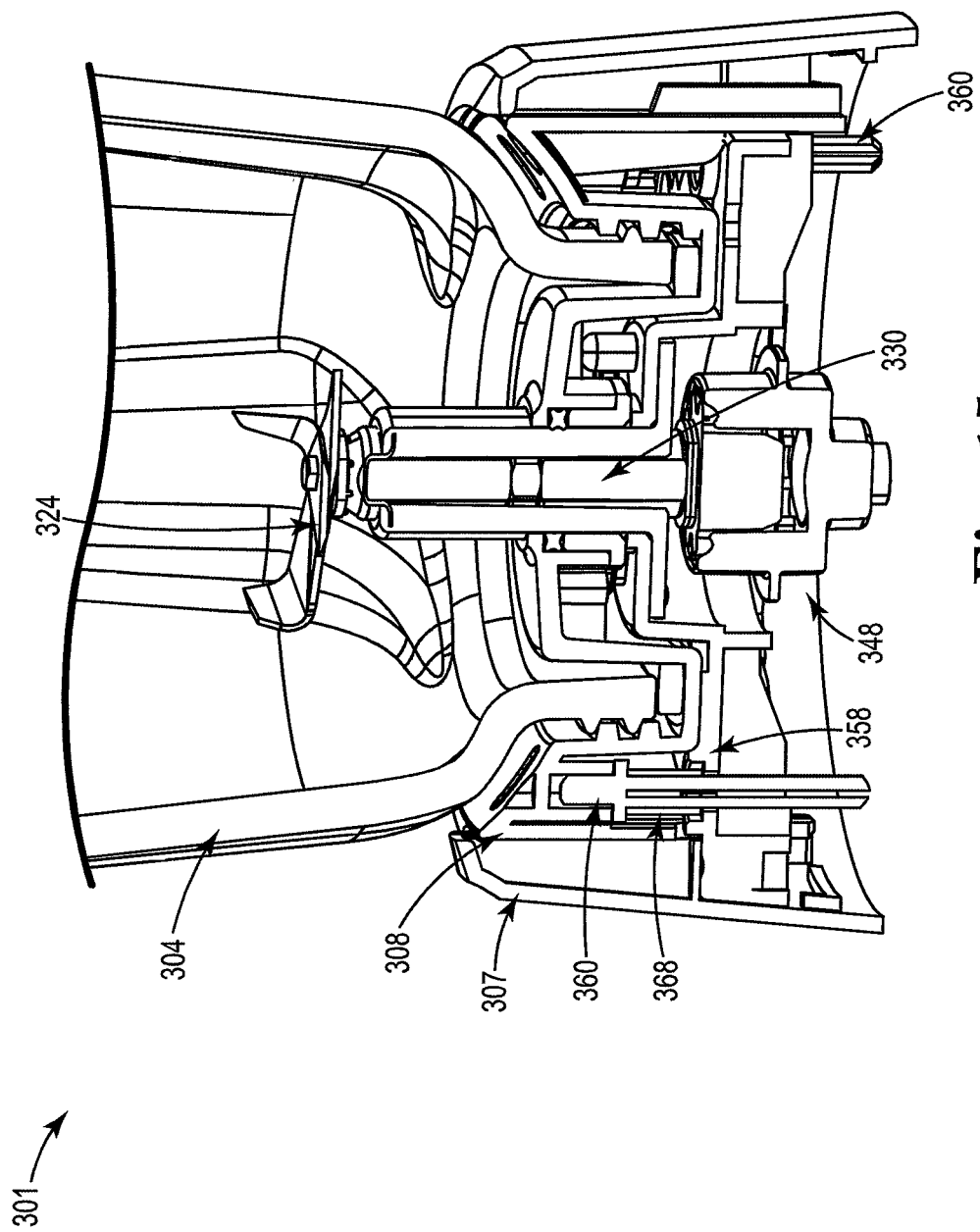
FIG. 15 is a perspective cross-sectional view of the blender jar assembly of FIG. 14 with integrated linear strut units in a vertically compressed position, according to various embodiments.

A third embodiment of a blending appliance as described herein, such as a blender similar to blender 100, is shown and described with reference to FIGS. 14 and 15. In particular, an alternative jar assembly 301 with internal movement is shown and described. The components of the jar assembly 301 can be generally the same as the components of the jar assembly 101 of blender 100, with certain exceptions, and can be generally the same as the described components of the jar assembly 201, described above. In particular, the jar assembly 301 includes integrated movement that occurs internally to the jar assembly 301, as in jar assembly 201. FIG. 14 shows the jar assembly 301 in the static position and FIG. 15 shows the jar assembly 301 in the compressed position, as described herein.

As shown, the jar assembly 301 includes a movable part and a stationary part, where the stationary part is supported by a base unit and the movable part comprises a jar 304 and an inner collar 308. The jar assembly 301 comprises the jar 304 threadably attached to the inner collar 308 that also provides a bottom to the jar 304. The inner collar 308 is configured to slidably move relative to an outer collar 307 that is mountable to a base unit when a user applies a downward force to the jar 304. The inner collar 308 is vertically movable relative to the outer collar 307 via a movable component 360 that is fixed to the inner collar 308 and that slidably interfaces with a stationary component 358 of the outer collar 307. Also as shown, one or more guide bearings form a guide surface 368 and are shown within a stationary component 358, as described herein. A blade 324 is located within the jar 304, and is operatively coupled to a driven shaft 330 that receives a rotational connection via a separable drive connection 348, which can be similar to 148 and/or 248, as described herein. As shown, a driven shaft bearing 305 encircles, aligns and sheaths the driven shaft 330, which can be similar to the driven shaft 126, as described herein. The driven shaft bearing 305 is fixed with the outer collar 308 as part of the stationary structure of the jar assembly 301.

Figure 16:
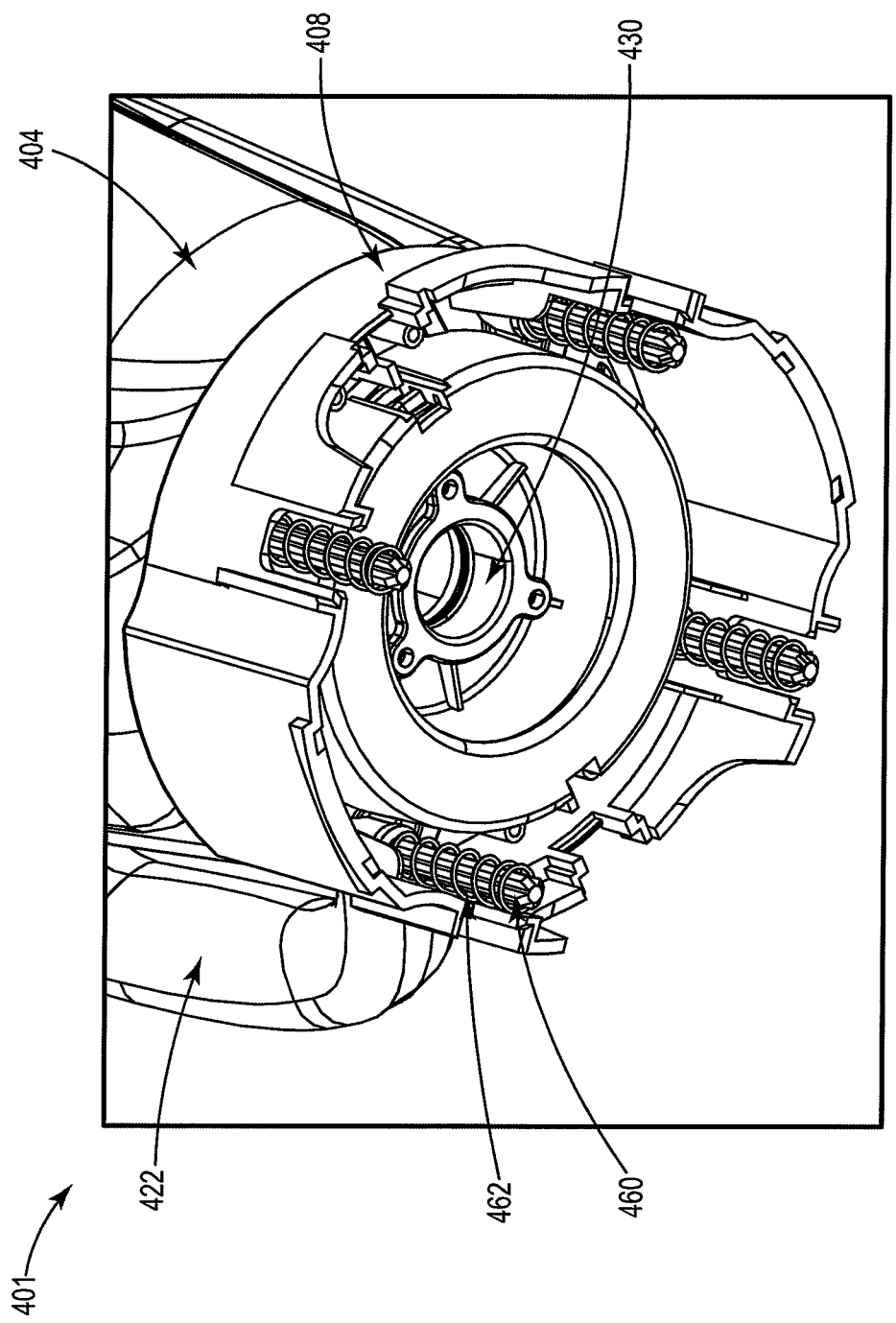
FIG. 16 is a lower perspective view of linear strut unit components attached to a jar assembly with integrated sliding components, according to various embodiments.
Figure 17:
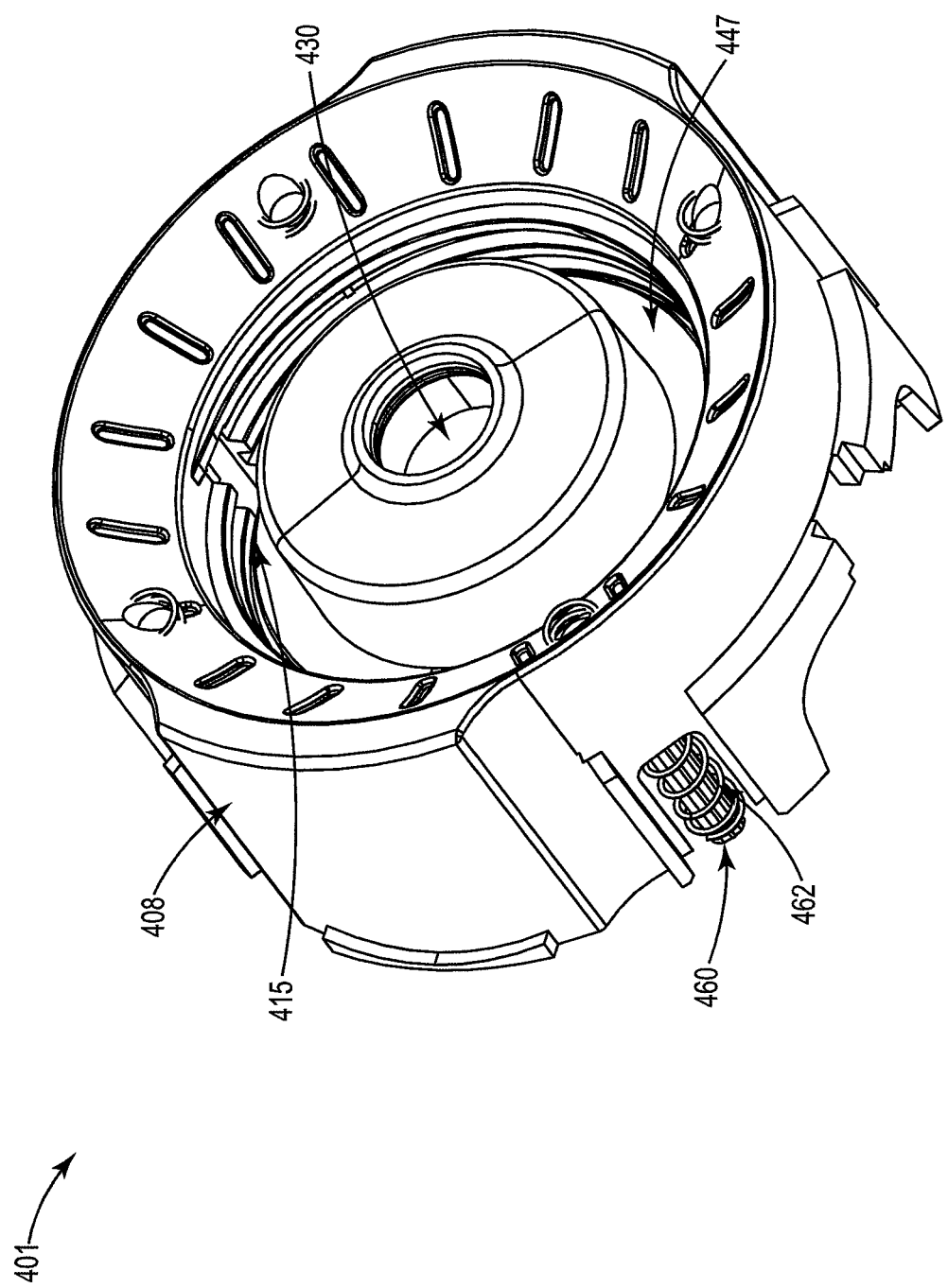
FIG. 17 is a lower perspective view of a jar collar of the jar assembly of FIG. 16 with linear strut unit components attached thereto, according to various embodiments.

Selected components for use in various embodiments herein are shown with reference to FIGS. 16 and 17. The components of the illustrated embodiments can be representative of certain features for use with blender 100, and/or jar assemblies 101, 201, and/or 301 as described herein.

With reference to FIG. 16, parts of a jar assembly 401 are shown from a lower perspective view to illustrate in particular various strut and guide components of the example jar assembly 401. A jar 404 with a handle 422 is shown, with a jar collar 408, which can be similar to jar collar 308 of FIGS. 14-15, according to various embodiments. A driven shaft bearing 430 is also shown from the lower side. As shown, various suspension components are also shown, including moveable components 460 and corresponding springs 462. A stationary component is not shown, although stationary component 158, 258, 358 can be utilized with the embodiment shown in FIG. 16.

Turning now to FIG. 17, the jar collar 408 as shown in FIG. 16 is shown from an upper perspective view with the jar 404 removed. A jar seat seal recess is shown at 447 and jar collar threads 415 are also shown. As described in other embodiments herein, a jar seat seal (e.g., 146) can be utilized to provide a water tight seal between the jar 404 and the jar collar 408.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A food preparation appliance, comprising:
   a base unit comprising a housing including a floor portion for supporting the base unit on a surface for use and by which a drive motor is supported, the drive motor including a drive shaft that extends from the drive motor in a direction away from the floor portion;
   a jar assembly configured to releasably interface with the base unit, the jar assembly comprising a jar with a bottom portion and a driven shaft that is rotatably positioned to pass through a bearing of the bottom portion, the driven shaft having a rotatable blade at one end of the driven shaft within the jar of the jar assembly, and a drive connection at the other end of the driven shaft outside of the jar and that is complementary with an end of the drive shaft to rotationally connect and be driven by the drive shaft when the jar assembly is interfaced with the base unit; and
   at least one linear guide component that defines a stationary guide surface for guiding a movable component in the direction of extension of the drive shaft, the movable component operatively connected to the jar so that the driven shaft and thus the blade remain axially stationary relative to the stationary guide surface as the jar and the movable component move in the direction of the extension of the drive shaft, the bearing of the bottom portion permitting sliding movement of the driven shaft relative to the bottom portion.

2. The food preparation appliance of claim 1, wherein both the movable component and the stationary guide surface are part of the base unit.

3. The food preparation appliance of claim 2, wherein the base unit comprises an upper base portion that is movable relative to a lower stationary base portion as operatively connected to one another by the linear guide component with the stationary component on the lower base portion and the movable component on the upper base portion.

4. The food preparation appliance of claim 3, wherein a biasing element is provided to bias the upper base portion away from the lower base portion for defining an operative first position of the jar assembly.

5. The food preparation appliance of claim 4, wherein the biasing element comprises a compression spring associated with the linear guide component.

6. The food preparation appliance of claim 5, further comprising a plurality of linear guide components.

7. The food preparation appliance of claim 5, wherein the movable component extends in a direction of extension of the drive shaft and the stationary guide surface also extends in the direction of extension of the drive shaft with the movable component and stationary component in alignment with one another to guide and allow movement of the upper base portion and thus the jar assembly relative to the lower base portion so that the jar assembly can be forcibly moved against the bias from the operative first positon to an operative second position.

8. The food preparation appliance of claim 1, wherein both the movable component and the stationary guide surface are part of the jar assembly.

9. The food preparation appliance of claim 8, wherein a first collar is connected with the jar and includes the movable component and a second collar is operatively supported to the first collar to move relative to the first collar and includes the stationary component.

10. The food preparation appliance of claim 9, wherein a biasing element is provided to bias the first collar away from the second collar for defining an operative first position of the jar.

11. The food preparation appliance of claim 10, wherein the biasing element comprises a compression spring associated with the linear guide component.

12. The food preparation appliance of claim 11, further comprising a plurality of linear guide components.

13. The food preparation appliance of claim 11, wherein the movable component extends in a direction of extension of the drive shaft and the stationary guide surface also extends in the direction of extension of the drive shaft with the movable component and stationary component in alignment with one another to guide and allow movement of the first collar and thus the jar relative to the second collar so that the jar can be forcibly moved against the bias from the operative first positon to an operative second position.

14. The food preparation appliance of claim 13, wherein the stationary component of the second collar is provided by a frame within the second collar, the frame also providing a driven shaft guide having a through-hole through which the driven shaft extends, the driven shaft guide including at least a bearing surface along which the driven shaft can rotate.

15. The food preparation appliance of claim 14, wherein the bearing surface is provided by at least one bearing element provided within the through-hole of the driven shaft guide.

16. The food preparation appliance of claim 15, wherein the driven shaft guide extends along the driven shaft through the bearing of the bottom portion of the jar assembly.

17. A method of using a food preparation appliance, comprising:
   positioning a jar assembly on a base unit configured to rotate a blade mounted on a vertical shaft, the jar assembly comprising a jar including food contents;
   biasing the jar in a static position with one or more linear strut units operatively connected to the jar assembly;
   pressing downward on the jar such that the jar moves downward, by moving a movable component of the linear strut units relative to a stationary guide surface; and
   moving at least a portion of the shaft and the blade relatively upward within the jar as a result of the pressing, thereby agitating the food contents of the jar based on a relative linear movement of the blade to the jar.

18. The method of claim 17, wherein the pressing an moving steps occur while the shaft and blade are rotatably driven by a drive shaft from a drive motor supported within the base unit.

19. The method of claim 17, wherein the pressing step moves the movable component as operatively provided as part of a first portion of the base unit relative to the stationary guide surface of a second portion of the base unit.

20. The method of claim 17, wherein the pressing step moves the movable component as operatively provided as part of a first portion of the jar assembly relative to the stationary guide surface of a second portion of the jar assembly.

* * * * *